July 7, 1936.  J. B. STRAUSS  2,046,661

GEAR AND RACK MESHING MECHANISM

Filed May 11, 1934

INVENTOR
Joseph B. Strauss
BY
ATTORNEY

Patented July 7, 1936

2,046,661

UNITED STATES PATENT OFFICE 2,046,661

GEAR AND RACK MESHING MECHANISM

Joseph B. Strauss, San Francisco, Calif.

Application May 11, 1934, Serial No. 725,043

5 Claims. (Cl. 238—123)

This invention relates to improvements in gear and rack meshing mechanism.

The principal object of the invention is to provide means for causing the meshing of the teeth of a movable gear with the teeth of a substantially stationary rack, irrespective of the initial starting relation of the teeth of the gear and rack when first engaging each other.

A further object is to produce a device of this character which may be utilized wherever a moving gear is to engage with a stationary rack.

A still further object is to produce a device which may be economically installed, one which is automatic in operation and one which will conform to standard practices in the construction of gears and racks.

Other objects and advantages will be apparent during the course of the following description.

Figure 2:
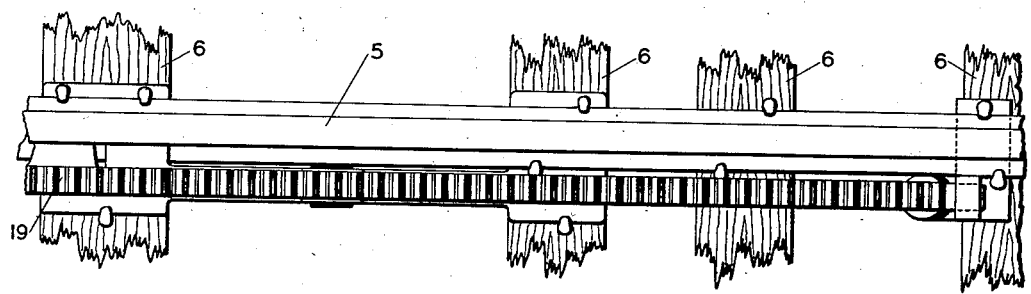
Figure 7:
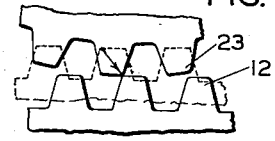
Figure 1:
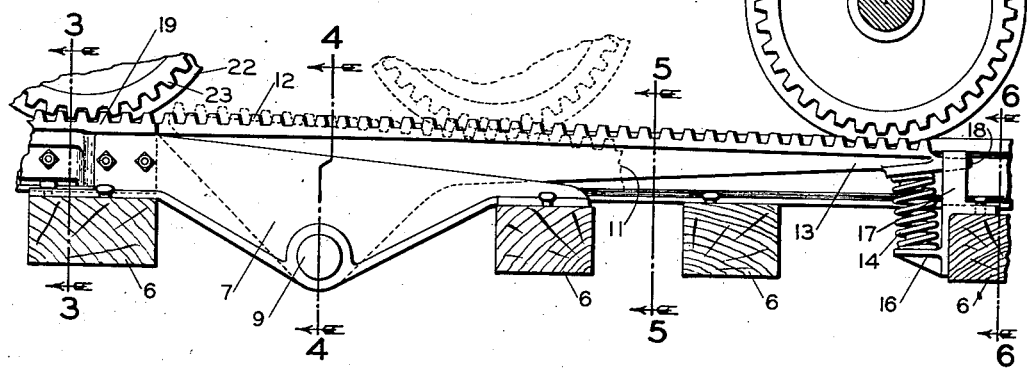
Figure 3:
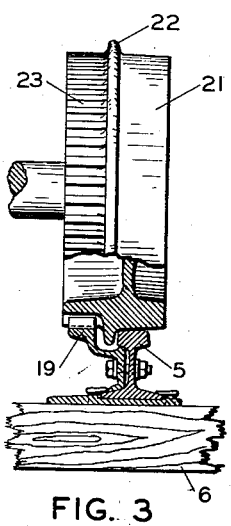
Figure 4:
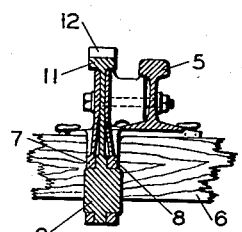
Figure 5:
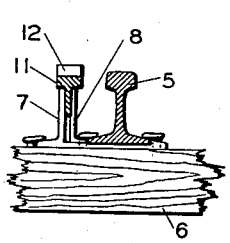
Figure 6:
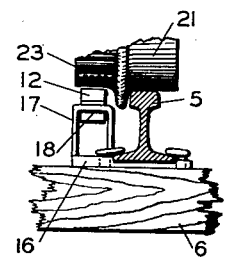

In the accompanying drawing forming a part of this specification and in which like numerals are employed to designate like parts throughout the same, Fig. 1 is a side elevation of my device as the same would be installed adjacent a railroad track, Fig. 2 is a top plan view of Fig. 1 with the car wheel and gear removed, Fig. 3 is a cross sectional view taken on the line 3—3 of Fig. 1 and showing the car wheel in elevation, Fig. 4 is a cross sectional view on the line 4—4 of Fig. 1, Fig. 5 is a cross sectional view on the line 5—5 of Fig. 1, Fig. 6 is a cross sectional view on the line 6—6 of Fig. 1, and Fig. 7 is a diagrammatic view showing the manner in which the teeth of the rack move downwardly and sidewise so as to mesh with the gear teeth.

There are many instances wherein it is necessary to cause a gear upon a moving structure to mesh with a relatively immovable rack, and in order to accomplish this engagement the teeth of the gear must be brought into mesh with the teeth of the rack. This can be accomplished in several ways when the mechanism is of light weight. However, when the mechanism is of considerable weight, such as in railroad trains, it is a very difficult matter to accomplish this meshing. Applicant has, therefore, devised a very simple mechanism wherein a light weight locomotive may have a gear attached to one of its driving wheels, which gear will mesh with a rack running parallel and to one side of the railway rail so that the engine will have a positive grip for moving a relatively heavy train, in counter-distinction to the customary rail grip which depends entirely upon the weight of the locomotive. In bridge construction the cost of the structure is materially increased if heavy locomotives are to travel thereover, as these locomotives depend for their traction on their concentrated weight which imposes severe strain upon the bridge structure.

Applicant has, therefore, devised means for moving a relatively heavy train with a light weight locomotive, through the employment of a rack running parallel with the rails and engaged by the gear carried on the locomotive, and through the simple mechanism herein to be described, applicant accomplishes the meshing in an ingenious manner so that a light weight locomotive may pick up a standard heavily loaded train, move across a bridge past switches, crossovers, etc., with the assurance that the power of the locomotive will be transferred to the pull, not only on the straightaway but also will be applied after the gear has left the rack on one side of a crossover or switch and will again positively engage the rack as soon as the crossover or switch has been passed.

In the accompanying drawing wherein for the purpose of illustration is shown a preferred embodiment of my invention, the numeral 5 designates an ordinary railroad rail carried upon the customary ties 6. Mounted adjacent the rail 5 and supported by two of the ties 6 are plates 7 and 8 which form bearing members for the trunnion 9 of a rack bar 11. This rack bar is provided with teeth 12, and an elongated end 13 which is supported by a spring 14 seated upon a bracket 16 mounted upon one of the ties. The bracket 16 carries a yoke 17 which engages the nose 18 of the rack bar and limits the upward movement of the spring action. At 19 I have shown a rack bar of standard construction which is spaced from the rail 5 and runs parallel therewith. At 21 I have shown a car wheel having the customary flange 22, and further provided with gear teeth 23.

As a result of this construction, the following will take place and assuming that a locomotive is equipped with gear teeth 23 and is moving in the direction of the arrows of Fig. 1: As the wheel 21 rolls upon the track 5 (and assuming the worst condition possible), the gear teeth 23 may assume the position shown at the right end of Fig. 1. In other words the teeth of the gear and the rack are entirely out of alignment. As the wheel 21 moves toward the left of the drawing the teeth 23 will engage the teeth 12 and cause the rack bar 11 to pivot upon the trunnion 9. Consequently as the rack bar moves from the full-line position of Fig. 1 to the dotted line position, the teeth upon the rack bar 11 will describe an arc struck from the center of the trunnion 9. Consequently all of the teeth to the right of the section line 4—4 will move to the right of the drawing and downwardly. This is illustrated in dotted lines of this figure. This movement of the teeth to the right and downwardly is indicated by an arrow in Fig. 7, the length of the arrow indicating the direction the teeth of the rack move, and in so doing the teeth of the rack will move into alignment with the teeth of the gear. As the wheel passes over the center line of the trunnion the weight of the locomotive will cause the high side of the rack (see dotted lines in Fig. 1 to the left of the section line 4—4) to drop to the full line position and be in alignment with the rack 19. There will be a slight slippage of the locomotive wheel upon the rail just as the wheel passes over the trunnion if the teeth of the gear wheel are out of alignment when the wheel first approaches the rack.

It will thus be seen that through the use of my device, a locomotive of light construction may pick up a heavy load and through the positive gripping arrangement between the gear and rack, may haul the heavy load up to the limits of its power without any slippage of the locomotive wheels with respect to the rails. Also it will be noted that the gear teeth on the wheel are above the plane of the wheel tread and consequently a crossover or switch may be passed without any complications whatsoever as would be in the case of a continuous rack and gear wheel which must be lifted and lowered to cause engagement as is now employed in certain cog and inclined railways.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. A device for meshing a moving gear, and a fixed rack comprising a rack section in alignment with the fixed rack and pivoted substantially midway of its length and at a point therebelow, whereby the moving gear first engaging said rack section will cause a tipping action of said rack section to effect a meshing of the respective teeth of said rack section and said gear and to cause an acceleration of movement of said gear as said gear passes over said pivot and resilient means normally maintaining the end of the pivoted rack section remote from the fixed rack in raised operative position.

2. A device for meshing a moving gear and a fixed rack comprising a tilting rack mounted on a fixed pivot and in alignment with a fixed rack, whereby a gear engaging said tilting rack first depresses one end of said rack to effect a meshing of the teeth with the tilting rack previous to passing over the pivot of said tilting rack, and to thereafter move said tilting rack about its pivot and into alignment with said fixed rack and resilient means normaly maintaining the end of the pivoted rack section remote from the fixed rack in raised operative position.

3. In a device of the character described, the combination of a track rail and a rack fixedly carried parallel to said rail, traction wheels rollable on said rail and having gear teeth capable of meshing with said rack, a movable rack section in alignment with the end of the fixed rack, said movable section being mounted on a trunnion spaced from the ends thereof and resilient means normally maintaining the end of the pivoted rack section remote from the fixed rack in raised operative position.

4. In a device of the character described, the combination of a track rail and a rack fixedly carried parallel to said rail, traction wheels rollable on said rail and having gear teeth capable of meshing with said rack, a movable rack section mounted on a trunnion substantially midway of its length and in alignment with said fixed rack, the end of said movable rack remote from said fixed rack being depressible, and spring means for supporting said depressible end.

5. A device for meshing a moving gear with a fixed rack including a fixed rack and a smooth rail parallel thereto upon which the moving gear is supported, of a trunnion spaced from the end of said fixed rack, a movable rack mounted on said trunnion and normally held in alignment with said fixed rack, the remote end of said movable rack being spaced from said trunnion a greater distance than the near end and capable of being depressed, whereby when the moving gear teeth engage the teeth of said remote end depression of said remote end will effect a meshing of the respective teeth and further progression of said gear over said movable rack will return said movable rack to a normal position and effect a sliding of the moving gear support on said smooth rail, when said gear passes over said trunnion.

JOSEPH B. STRAUSS.